United States Patent
Teach et al.

(10) Patent No.: US 9,717,180 B2
(45) Date of Patent: Aug. 1, 2017

(54) PRESSURE CONTROL FOR HYDRAULICALLY ACTUATED AGRICULTURAL HEADERS

(71) Applicant: DEERE & COMPANY, Moline, IL (US)

(72) Inventors: Kyle R. Teach, Ottumwa, IA (US); Thomas A. Nichols, Eldon, IA (US); David V. Rotole, Bloomfield, IA (US); Walter C. Wright, Pella, IA (US)

(73) Assignee: DEERE & COMPANY, Moline, IL (US)

( * ) Notice: Subject to any disclaimer, the term of this patent is extended or adjusted under 35 U.S.C. 154(b) by 361 days.

(21) Appl. No.: 14/455,578

(22) Filed: Aug. 8, 2014

(65) Prior Publication Data
US 2016/0037721 A1 Feb. 11, 2016

(51) Int. Cl.
| | |
|---|---|
| *F16D 31/02* | (2006.01) |
| *A01D 41/14* | (2006.01) |
| *F15B 21/08* | (2006.01) |
| *F15B 21/00* | (2006.01) |

(52) U.S. Cl.
CPC .......... *A01D 41/145* (2013.01); *F15B 21/005* (2013.01); *F15B 21/087* (2013.01); *F15B 21/08* (2013.01)

(58) Field of Classification Search
CPC ............................. F15B 21/004; F15B 21/087
USPC .......................................................... 60/473
See application file for complete search history.

(56) References Cited

U.S. PATENT DOCUMENTS

2007/0204582 A1* 9/2007 Coers ................... A01D 41/141
56/10.2 E
2007/0261277 A1* 11/2007 Ishikawa ............... E02F 9/2246
37/424

* cited by examiner

*Primary Examiner* — Thomas E Lazo
*Assistant Examiner* — Daniel Collins

(57) ABSTRACT

A pressure control system is described for a vehicle having a hydraulically actuated header. The system may include a hydraulic lifting circuit for raising and lowering the header, a hydraulic float circuit for floating the header, and a drain tank. A lifting circuit control valve may be configured to control drainage of hydraulic fluid from the hydraulic lifting circuit to the drain tank. A float circuit control valve may be configured to control drainage of hydraulic fluid from the hydraulic float circuit to the drain tank. A user interface may be configured to receive one or more inputs to control drainage of hydraulic fluid from the hydraulic circuits. Based upon the one or more inputs, at least one of the control valves may be opened, in order to depressurize, respectively, one of the hydraulic circuits.

16 Claims, 6 Drawing Sheets

PRESSURE CONTROL FOR HYDRAULICALLY ACTUATED AGRICULTURAL HEADERS

CROSS-REFERENCE TO RELATED APPLICATION(S)

Not applicable.

STATEMENT OF FEDERALLY SPONSORED RESEARCH OR DEVELOPMENT

Not applicable.

FIELD OF THE DISCLOSURE

This disclosure relates to the steering of vehicles, including vehicles with caster-mounted rear wheels.

BACKGROUND OF THE DISCLOSURE

Various agricultural vehicles are configured to support a header for cutting, gathering, or otherwise processing crop material. For example, agricultural windrowers may be configured to support various headers configured to cut crop material from the ground and arrange the cut material in windrows for later processing (e.g., by a separate baler). As another example, agricultural combines may be configured to support various headers configured to cut crop material from the ground and move the cut material into the body of the combine for further processing (e.g., threshing and winnowing).

In order to raise, lower, and otherwise move or support an attached header, various agricultural machines (e.g., windrowers, combines, and so on) may include one or more hydraulic cylinders. For example, one or more cylinders may be provided for generally raising or lowering a header, one or more cylinders may be provided for tilting the header laterally, and one or more cylinders (e.g., in communication with one or more accumulators) may be provided to float the header with respect to the ground. In certain configurations, these cylinders may be included, respectively, in distinct hydraulic circuits or in distinct portions of a single hydraulic circuit.

In order to perform maintenance on a header, an operator may generally lower the header, such that the header is fully supported by the ground (or another support) rather than the agricultural vehicle. An attached header may also be lowered to the ground in order to replace that header with another (e.g., a header configured for different crops), or for various other reasons. Known hydraulic systems for lifting, floating or tilting the header, however, may tend to remain somewhat pressurized even when the header appears to have been fully lowered to the ground. This trapped pressure may result in undesirable movement, or resistance to movement, of the header or of other components of the vehicle during maintenance of the header (or other operations). For this reason, and others, it may therefore be useful to provide a system and method for appropriately relieving pressure within relevant hydraulic systems when a header is to be lowered (or in various other instances).

SUMMARY OF THE DISCLOSURE

A pressure control system and related method are disclosed for an agricultural vehicle having a header and one or more of a lifting circuit, a float circuit, and a tilting circuit for the header.

According to one aspect of the disclosure, a vehicle may include a hydraulic lifting circuit for raising and lowering the header, a hydraulic float circuit for floating the header, and a drain tank. A lifting circuit control valve may be configured to control drainage of hydraulic fluid from the hydraulic lifting circuit to the drain tank. A float circuit control valve may be configured to control drainage of hydraulic fluid from the hydraulic float circuit to the drain tank. A user interface may be configured to receive one or more inputs to control drainage of hydraulic fluid from the hydraulic circuits. Based upon the one or more inputs, at least one of the control valves may be opened, in order to depressurize, respectively, one of the hydraulic circuits.

In certain embodiments, the control valves may be opened sequentially. The user interface may be configured to direct an operator to provide an input to open the lifting circuit control valve before providing an input to open the float circuit control valve. The lifting circuit control valve and the float circuit control valve may be held open simultaneously, as long as the vehicle is in an energized operating state.

In certain embodiments, a hydraulic tilt circuit may also be provided, with a tilt circuit control valve. The user interface may be further configured to receive a tilt control input to control drainage of hydraulic fluid from the hydraulic tilt circuit. The tilt circuit control valve may be opened and held open based upon the tilt control input.

The details of one or more embodiments are set forth in the accompanying drawings and the description below. Other features and advantages will become apparent from the description, the drawings, and the claims.

BRIEF DESCRIPTION OF THE DRAWINGS

Like reference symbols in the various drawings indicate like elements.

DETAILED DESCRIPTION

Figure 1:
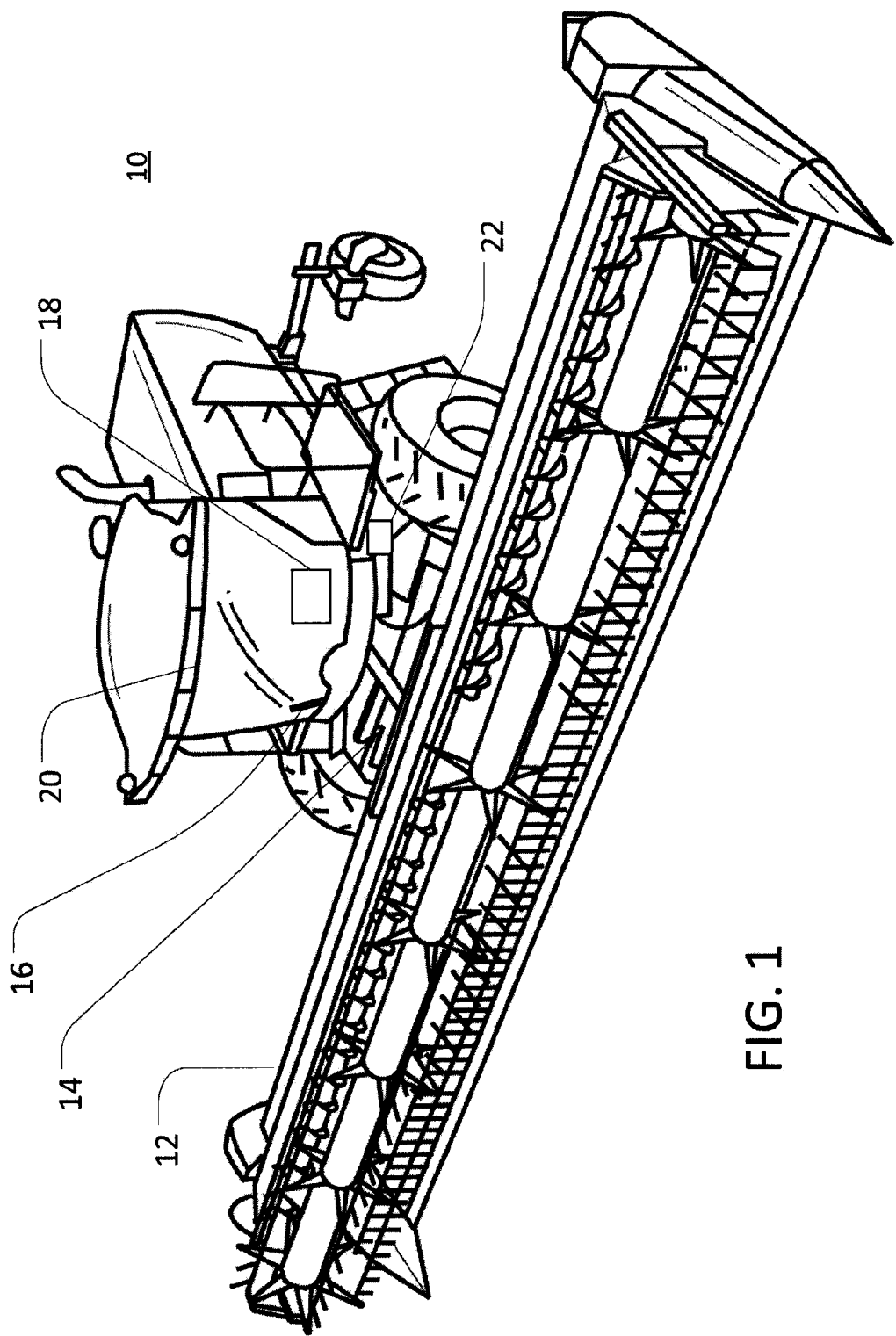
FIG. 1 is a simplified perspective view of an example agricultural vehicle with a header.

The following describes one or more example embodiments of the disclosed pressure control system, as shown in the accompanying figures of the drawings described briefly above. Various modifications to the example embodiments may be contemplated by one of skill in the art.

As also noted above, known agricultural vehicles may utilize various hydraulic systems (e.g., various hydraulic cylinders included in various hydraulic circuits) to control movement of headers supported by the vehicles. In certain embodiments, a hydraulic lifting circuit with a hydraulic cylinder may be provided for raising or lowering a header. In certain embodiments, a hydraulic float circuit may also be provided for floating the header with respect to the ground (e.g., to maintain appropriate ground clearance or to avoid damage to the header from impacts with the ground or other objects). For example, a float circuit may include a hydraulic accumulator (or similar device) in communication with a hydraulic cylinder, such that the pressure supplied by the accumulator causes the cylinder to support a portion of the weight of the header during operation of the vehicle. In this way, a header may float over ground obstacles without requiring an impact (or other lifting) force that exceeds the full weight of the header. In certain embodiments, a hydraulic tilt circuit may also be provided for tilting the header laterally (e.g., to address sloped field terrain).

Such hydraulic systems (e.g., lifting, float and tilt circuits) may be useful to appropriately maneuver a header for attachment of the header to a vehicle, for operation of the vehicle and header to cut crops, or to prepare for maintenance work on the header (or the vehicle). To facilitate maintenance (and other) operations, for example, it may sometimes be useful to lower a header such that the full weight of the header is supported by the ground (or another support not connected to the vehicle). In various instances, this may be accomplished through the control of a lifting circuit (e.g., through retraction of a hydraulic cylinder of the lifting circuit).

Under known designs, however, even if an operator manually releases pressure from the float circuit after lowering a header to the ground with the lifting circuit, the combined hydraulic systems may not reach an energy free (i.e., fully depressurized) state. For example, after an operator has used the lifting circuit to lower the header to the ground, it may appear that the ground is supporting the entire weight of the header and, accordingly, that the lifting circuit is in an energy free state. Where a float (or other) circuit is also used, however, additional pressure may also be stored within the float (or other) circuit such that the float circuit may continue to support some portion of the weight of the header, offsetting the weight of the header on the ground. Accordingly, if the float circuit is not depressurized, the collective hydraulic circuits supporting the header may not be in a fully energy free state. Typically, however, float circuits may not be depressurized from within the cab of a vehicle. For example, in typical designs, an operator must exit the cab and manually operate a hand valve to depressurize the float (or other) circuit. This may introduce undesired time and complexity to pre-maintenance (or other) operations.

Further, even if an operator manually depressurizes the float circuit after lowering the header with the lifting circuit, the lifting circuit may retain sufficient residual pressure so as to re-assume support of a portion of the weight of the header. As such, in order to ensure that all of the relevant systems have been fully depressurized, it may be necessary to re-lower the header with the lifting circuit after the float circuit has been released. Again, this may introduce undesired time and complexity to pre-maintenance (or other) operations.

To address this issue and others, it may accordingly be useful to provide a pressure control system for lifting, float, tilting and other hydraulic circuits for an agricultural header. In certain embodiments, a control valve (e.g., an electrically or hydraulically operated directional control valve) may be provided for one or more of a hydraulic lifting, float, tilting, or other circuit for a header. Based upon a relevant command (e.g., an input from an operator using a graphical user interface ("GUI")), these valves may be held in an open state in order to appropriately depressurize the relevant circuits. In certain embodiments, for example, these valves may be held in an open state until an operator either indicates (e.g., with another input using the GUI) that one or more of the valves should be closed or places the vehicle in a de-energized state. A de-energized state may correspond, for example, to a key of the vehicle being turned to an "off" position, such that the engine of the vehicle does not run, and no power is provided by the vehicle to various vehicle sub-systems (e.g., to hydraulic pumps, electrical motors, and so on). In contrast, a vehicle may be viewed as operating in an energized state if the engine of the vehicle is running, or if the engine of the vehicle is not running, but various vehicle sub-systems (e.g., hydraulic pumps, electrical motors, and so on) are still receiving power (e.g., from an on-board battery system or other energy storage device).

In certain embodiments, for example, an operator may provide a first input at a graphical user interface ("GUI"), which may result in a lifting circuit control valve for a hydraulic lifting circuit being held open. Accordingly, the hydraulic lifting circuit may be depressurized such that a lifting cylinder of the circuit no longer supports any weight of the header. The operator may then provide a second input at the GUI, which may result in a float circuit control valve for a hydraulic float circuit being held open. Accordingly, the hydraulic float circuit may be depressurized such that a float cylinder of the circuit also no longer supports any weight of the header. The operator may then provide a third input at the GUI, which may result in a tilt circuit control valve for a hydraulic tilt circuit being held open. Accordingly, the hydraulic tilt circuit may be depressurized such that a tilt cylinder of the circuit also no longer supports any weight of the header. With each of these control valves being held open, the collective hydraulic systems for movement of the header may be placed in a reliably energy free state.

In certain embodiments, various of these valves (or other similar valves) may be operated in a different order, or based upon different inputs, than in the example presented above. For example, the float and lifting circuit control valves may be opened simultaneously based upon a single operator input, or the various control valves may be operated in various different sequences. In certain embodiments, only a subset of these valves (e.g., only the lifting and float circuit control valves) may be held open.

Referring now to FIG. 1, an example vehicle 10 is depicted. It will be understood that the configuration of the vehicle 10 presented in FIG. 1 is intended only as an example and that other configurations in keeping with this disclosure may be possible. As depicted in FIG. 1, the vehicle 10 may be an agricultural windrower, with a header 12 for cutting and gathering crop material (e.g., a grain platform or pick-up header). Various hydraulic circuits 14 may be included near the front of the vehicle 10, in order to control the lifting (and lowering), tilting, and floating of the header 12. Various control devices, including hydraulic control lever 16 and display device 18 (e.g., a touch-screen interface) may be provided in a cab 20 of the vehicle 10 for control of the various hydraulic circuits 14. For example, using the lever 16 or another device (e.g., a button or switch), an operator may controllably raise or lower the header 12 using a hydraulic lifting circuit included in the various circuits 14.

In certain embodiments, a controller 22 may also be provided. The controller 22 may be in electrical (or other) communication with various devices of the vehicle 10, including various controllable valves of the hydraulic circuits 14 (or other components), in order to control various aspects of the operation of the vehicle 10. The controller 22 may be configured as a computing device with one or more processors and memory architectures, as a hard-wired computing circuit (or circuits), as a hydraulic or electrohydraulic control device, and so on.

Figure 2:
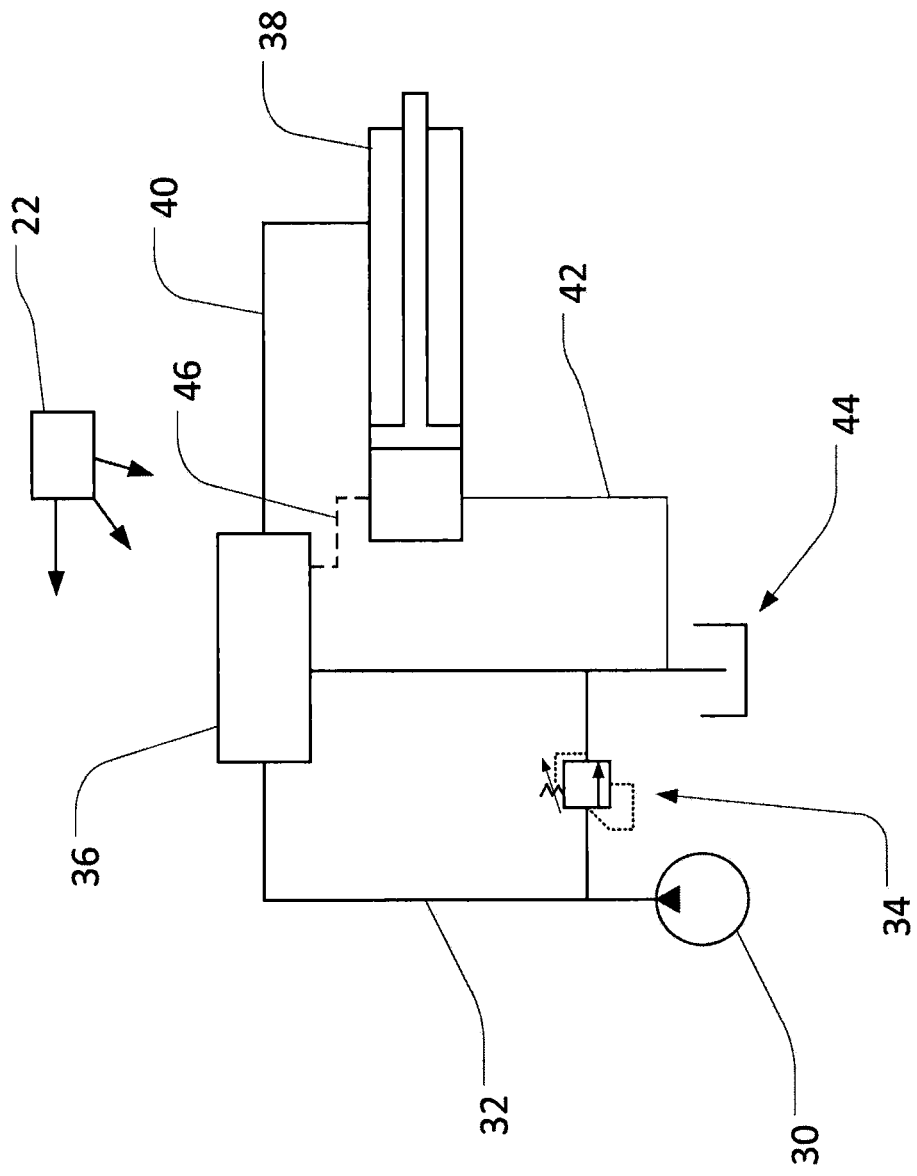
FIG. 2 is a schematic view of an example pressure control system for a hydraulic system associated with the header of FIG. 1.

Referring also to FIG. 2, in certain embodiments, one or more of the hydraulic circuits 14 for moving the header may be configured as a hydraulic lifting circuit 14a. For example, in order to control the raising or lowering of the header 12 (not shown in FIG. 2), a hydraulic pump 30 may provide pressurized flow through a flow line 32, as regulated by a pressure relief valve 34. Flow through the flow line 32 may enter valve arrangement 36, which may include one or more valves arranged in various ways.

Depending upon signals from the controller 22 (or other factors), the valves of the valve arrangement 36 may be actuated to control the operation of a lifting cylinder 38 for raising and lowering the header 12. For example, to raise the header 12, the valve arrangement 36 may be controlled to route flow from the pump 30 through a flow line 40 to the rod end of the cylinder 38. This may cause the piston of the cylinder 38 to move (to the left in FIG. 2) in order to raise the header 12, forcing fluid out of the base end of the cylinder 38, through a flow line 42, to a hydraulic tank 44. In certain embodiments, to lower the header 12, the valve arrangement 36 (or another device) may be controlled to stop the pressurization of the rod end of the cylinder 38 through the flow line 40, such that the weight of the header 12 moves the piston (to the right in FIG. 2). In certain embodiments, alternatively, a flow line 46 may be provided, such that the valve arrangement 36 may be controlled to actively pressurize the base end of the cylinder 38.

In order to ensure that the hydraulic lifting circuit 14a is in an energy free state (i.e., has been fully depressurized with respect to the lifting cylinder 38), further control may be effected using the valve arrangement 36. For example, based upon an operator providing an appropriate input at the display device 18, the controller 22 may direct one or more valves within the valve arrangement 36 to open, such that any pressure within the lifting cylinder 38 (e.g., at the rod end of the cylinder 38) may be released to the tank 44. In certain embodiments, the controller 22 may direct such valves (or the valves may be otherwise configured) to remain open, until the operator actively re-engages the lifting circuit 14a or the vehicle 10 is placed in a de-energized state (i.e., is removed from the energized operating state by the operator turning a key to the vehicle 10 to a full "off" position).

It will be understood that other configurations may be possible. For example, in certain embodiments, the header 12 may be alternatively lifted by porting flow through an alternative flow line 42 to the base end of the cylinder 38. Likewise, the cylinder 38 may be configured as a double-acting cylinder (e.g., with the flow line 46 being configured to provide operating pressure to the base end of the cylinder 38). Further, in certain embodiments, a similar circuit may be utilized to control movement of the header 12 other than raising and lowering of the header 12. For example, in certain embodiments, a circuit similar to the circuit 14a may be configured as a tilt circuit for control of the lateral tilting of the header 12.

Figure 3:
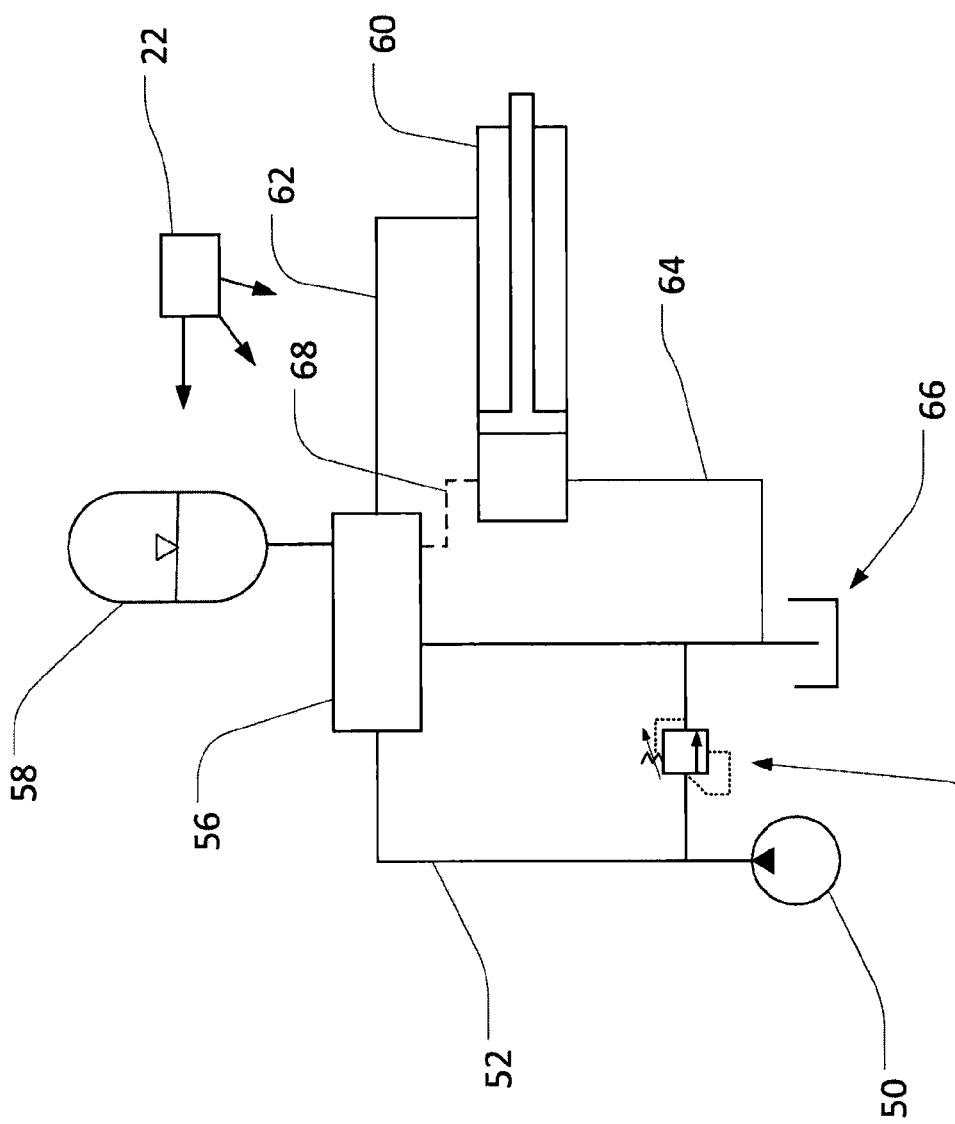
FIG. 3 is a schematic view of another example pressure control system for a hydraulic system associated with the header of FIG. 1.

Referring also to FIG. 3, in certain embodiments, one or more of the hydraulic circuits 14 for moving the header may be configured as a hydraulic float circuit 14b. For example, in order to provide a relatively constant lifting pressure for the header 12 (not shown in FIG. 3), and thereby allow the header 12 to float over ground contours and other obstacles, a hydraulic pump 50 may provide pressurized flow through a flow line 52, as regulated by a pressure relief valve 54.

Flow through the flow line 52 may enter valve arrangement 56, which may include one or more valves arranged in various ways. Flow from the pump 50 may also be ported (e.g., via the valve arrangement 56) to a hydraulic accumulator 58. (As depicted, the accumulator 58 may be a gas-loaded accumulator. It will be understood, however, that other configurations may be possible.)

Depending upon signals from the controller 22 (or other factors), the valves of the valve arrangement 56 may be actuated to control the operation of a float cylinder 60. For example, to energize (i.e., pressurize) the system for floating of the header 12, the valve arrangement 56 may be controlled to route flow from the pump 50 through a flow line 62 to the rod end of the cylinder 60. The valve arrangement 56 may additionally (or alternatively) route flow from the pump 50 to charge the accumulator 58. Once charged, the accumulator may provide a relatively constant pressure to the rod end of the cylinder 60 (e.g., through the flow line 62), even in the absence of flow from the pump 50. Accordingly, the cylinder 60 may support a portion of the weight of the header 12, such that the header 12 appropriately floats over contours and obstacles. A flow line 64 may provide an outlet from the base end of the cylinder 60 to the tank 66.

In order to ensure that the hydraulic floating circuit 14b is in a zero energy state (i.e., has been fully depressurized with respect to the float cylinder 60), further control may be effected using the valve assembly 56. For example, based upon an operator providing an appropriate input at the display device 18, the controller 22 may direct one or more valves within the valve arrangement 56 to open, such that any pressure within the float cylinder 60 (e.g., at the rod end of the cylinder 60) or within the accumulator 58 may be released to the tank 66. In certain embodiments, the controller 22 may direct such valves (or the valves may be otherwise configured) to remain open, until the operator actively re-engages the float circuit 14b or the vehicle 10 is placed in a de-energized state (i.e., is removed from the energized operating state by the operator turning a key to the vehicle 10 to a full "off" position).

It will be understood that other configurations may be possible. For example, in certain embodiments, the header 12 may be alternatively floated by porting flow through an alternative flow line 68 to the base end of the cylinder 60. Likewise, the cylinder 60 may be configured as a double-acting cylinder (e.g., with the flow line 68 being configured to provide operating pressure to the base end of the cylinder 60). Further, in certain embodiments, a similar circuit may be utilized to control movement of the header 12 other than for floating operations.

In certain embodiments, the hydraulic circuits 14a and 14b (or other pressure control circuits) may both be included in a particular vehicle 10, for control of the movement of the header. As such, in certain embodiments, a single pump may provide hydraulic flow to both of the circuits 14a and 14b (and others) and a single tank may be utilized by both circuits 14a and 14b. Likewise, the valve arrangements 36 and 56 may be combined into a single valve arrangement, with various shared components.

Figure 4:
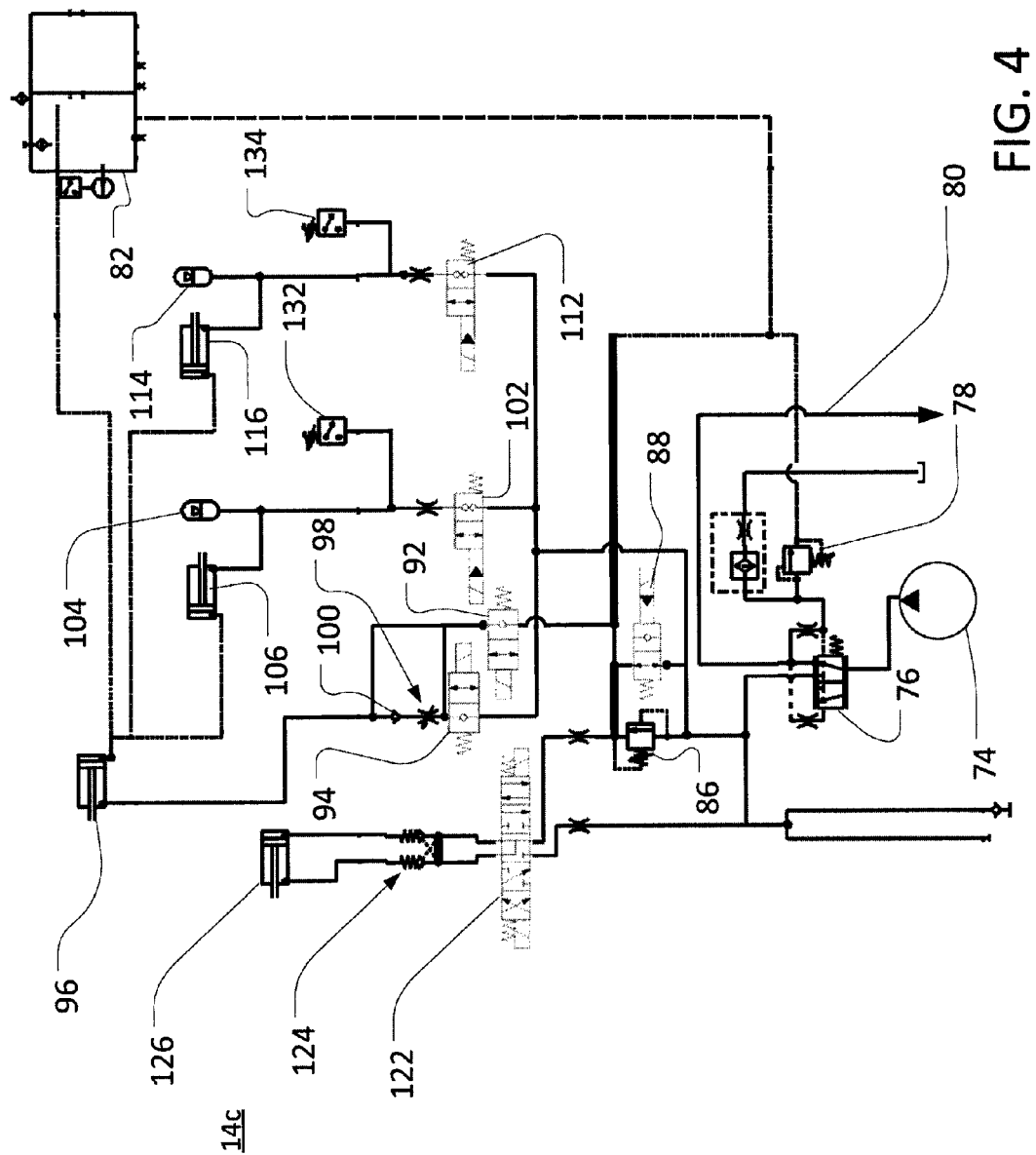
FIG. 4 is a schematic view of a hydraulic circuit for still another example pressure control system.

Referring also to FIG. 4, for example, a combined hydraulic circuit 14c may be included in the vehicle 10. A pump 74 may be configured to provide operational pressure to various devices. In certain embodiments, the pump 74 may provide hydraulic flow to other circuits as well as the circuit 14c. For example, a priority valve 76 may be configured to receive hydraulic flow from the pump 74 and route the flow to the various devices of the circuit 14c (as discussed in greater detail below) as well as to outlet line 80, which may feed the flow from the pump 74 to various other systems (e.g., various hydraulically-operated steering systems (not shown)). A pressure control valve 86 and a flow control valve 88 may control the release of pressure to tank. (The various circuits may drain to a common tank 82, or to various distinct tanks.) The valve 86 is depicted as a pilot-operated solenoid poppet valve. It will be understood, however, that other configurations may be possible for the valve 86 and various other valves discussed herein.

One branch of the circuit 14c may provide hydraulic flow from the pump 74 to a hydraulic cylinder 96, which may be configured to raise or lower the header 12 (not shown in FIG. 4) of the vehicle 10 (i.e., may be configured as a "lift" cylinder). As depicted, the cylinder 96 may be configured to receive flow from the pump 74 at the base end of the cylinder 96 and to port the flow to tank from the rod end of the cylinder 96. Other configurations may also be possible. Also as depicted, the cylinder 96 may be configured to lift the header 12 when the cylinder 96 is pressurized by the pump 74, and to allow the header 12 to lower based upon the weight of the header 12 itself.

In the embodiment depicted, two flow control valves 92 and 94 are interposed between the pump 74 and the lift cylinder 96. As depicted, the valves 92 and 94 are pilot-operated, 2-way, 2-position, bi-directional poppet valves, with a check valve arrangement within the valve 92 allowing flow towards the cylinder 96 as a default and a check valve arrangement within the valve 94 allowing flow away from the cylinder 96 as a default. Other configurations of the valve 94 may also be possible, and a check valve 100 and a variable orifice 98 may also be provided. Collectively, the lift cylinder 96, the pump 74, the valves 92 and 94, and the related flow lines make up a hydraulic lifting circuit (which may be viewed as a sub-circuit of the larger hydraulic circuit 14c).

During normal operation, the valves 92 and 94 may be selectively actuated in order to appropriately control flow into (and out of) the cylinder 96. In order to place the header is an energy free state, the valves 92 and 94 (collectively or individually) may be commanded to open. This may allow pressure to fully drain from the lift cylinder 96 to tank and thereby depressurize the hydraulic lifting circuit to place that portion of the overall hydraulic circuit 16c in an energy free state (i.e., to ensure that no pressure is trapped within the cylinder 96). In certain implementations, the valves 92 and 94 may be held open for as long as the vehicle remains in an energized state (e.g., until a key of the vehicle is turned to "off") or until re-pressurization of the cylinder 96 is commanded.

Another branch of the circuit 14c may provide hydraulic flow from the pump 74 to hydraulic cylinders 106 and 116, which may be configured, respectively, to float the left and right sides of the header 12 (not shown in FIG. 4) with respect to the ground (i.e., may be configured as "float" cylinders). As depicted, the cylinders 106 and 116 may be configured to receive flow from the pump 74 at the base end of the cylinders 106 and 116 and to port the flow to tank from the rod ends of the cylinders 106 and 116. Other configurations may also be possible. Also as depicted, the cylinders 106 and 116 may be configured to float the header 12 upward when the cylinders 106 and 116 are pressurized by the pump 74, and to allow the header 12 to lower based upon the weight of the header 12 itself.

Hydraulic accumulators 104 and 114 may be provided, respectively, for the two float cylinders 106 and 116. This may be useful, for example, in order to provide a relatively constant pressure to the float cylinders 106 and 116 in order to effectively float the header 12 during operation. The accumulators 104 and 114 may be charged with pressure by the pump 74. As depicted, the accumulators 104 and 114 may be configured as gas-loaded accumulators. It will be understood, however, that other configurations may be possible.

In the embodiment depicted, flow control valves 102 and 112 are interposed between the pump 74 and the float cylinders 106 and 116, respectively. In this way, through control of the respective valves 102 and 112, the actuation of the cylinders 106 and 116 and the charging of the accumulators 104 and 114 may be controlled. As depicted, the valves 102 and 112 are pilot-operated, 2-way, 2-position, blocking poppet valves, with flow from the pump 74 to the cylinders 106 and 116 blocked as a default. Other configurations of the valves 102 and 112 may also be possible, and various other devices may be provided, including pressure transducers 132 and 134. Collectively, the float cylinders 106 and 116, the pump 74, the valves 102 and 112, the accumulators 104 and 114, and the related flow lines make up a hydraulic float circuit (which may be viewed as a sub-circuit of the larger hydraulic circuit 14c).

In certain embodiments, a different number of float cylinders, accumulators, and other devices may be provided. For example, a single float cylinder with a single associated accumulator may be utilized in order to float the header 12, rather than the left- and right-side float cylinders 106 and 116 and the associated accumulators 104 and 114.

During normal operation, the valves 102 and 112 may be selectively actuated in order to appropriately control flow into (and out of) the cylinders 106 and 116, and the accumulators 104 and 114. In order to place the header is an energy free state, the valves 102 and 112 (collectively or individually) may be commanded to open. This may allow pressure to fully drain to tank from the float cylinders 106 and 116, respectively, and thereby depressurize the hydraulic float circuit to place that portion of the overall hydraulic circuit 16c in an energy free state (i.e., to ensure that no pressure is trapped within the cylinder 96). In certain implementations, the valves 102 and 112 may be held open for as long as the vehicle remains in an energized state (e.g., until a key of the vehicle is turned to "off") or until re-pressurization of the cylinders 106 and 116 (or the accumulators 104 and 114) is commanded.

In the embodiment depicted in FIG. 4, a tilt cylinder 126 is also provided, in order to control tilting of the header 12. As depicted, the cylinder 126 may be a double-acting cylinder, configured to receive flow from the pump 74 at the base end of the cylinder 126 and at the rod end of the cylinder 126. A directional control valve 122 (e.g., a 5-way, 4-position spool valve) may be interposed between the pump 74 and the tilt cylinder 126. Accordingly, through control of the valve 122 and of the pilot-operated check valves 124, the tilt cylinder 126 may be appropriately actuated. Collectively, the tilt cylinder 126, the pump 74, the valves 122 and 124, and the related flow lines make up a hydraulic tilt circuit (which may be viewed as a sub-circuit of the larger hydraulic circuit 14c).

In certain embodiments, the valve 122 and the check valves 124 may be operated to depressurize the tilt cylinder 126 (e.g., in parallel or in series with operation of various of the valves 92, 94, 102 and 112 to depressurize the lift 96 and float cylinders 106 and 116. In certain embodiments, the hydraulic tilt circuit may be otherwise configured. For example, the hydraulic tilt circuit may be configured as a hydraulic circuit similar to the hydraulic circuit 14a of FIG. 2 or to the float circuit (or a portion thereof) of FIG. 4.

In certain implementations, pressure control for movement of a header may be implemented as part of a pressure control ("PC") method such as PC method 200. The PC method 200 may be represented as various instruction sets and subroutines stored on a storage device forming part of (or otherwise coupled to) the controller 22, and may be executed by one or more processors and one or more memory architectures (e.g., as included in or associated with the controller 22). In certain implementations, the PC method 200 may be a stand-alone method. In certain implementations, the PC method 200 may operate as part of, or in conjunction with, one or more other methods or processes and/or may include one or more other methods or processes. Likewise, in certain implementations, the PC method 200 may be represented and implemented by an entirely hardware-based configuration or as a hydraulically or mechanically operated control structure, in addition or as an alternative to a configuration having the PC method 200 as a set of instructions stored in a storage device (e.g., a storage device included in or associated with the controller 22). For the following discussion, the PC method 200 will be described for illustrative purposes. It will be understood, however, that other implementations may be possible.

Figure 5:
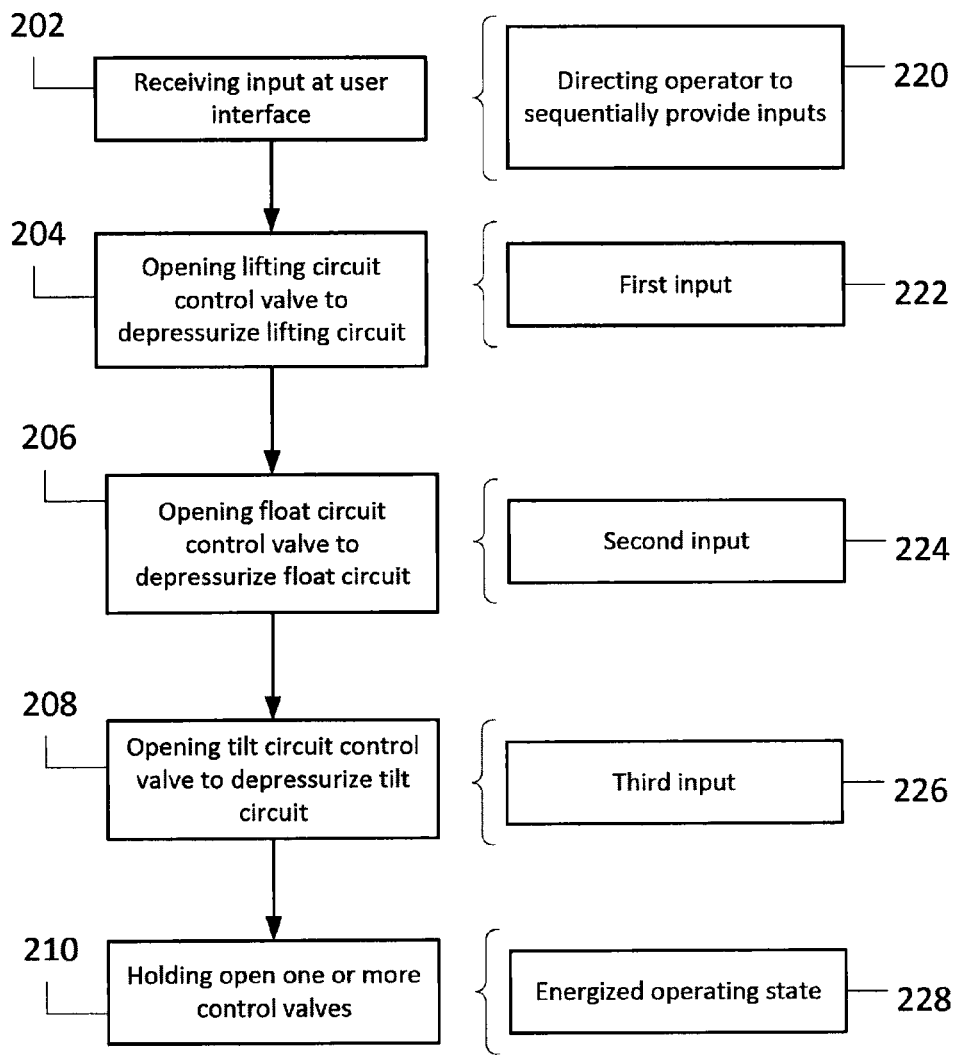
FIG. 5 is a diagrammatic view of an example pressure control method for use with the vehicle of FIG. 1.

Referring also to FIG. 5, the PC method 200 may include receiving 202 an input at a user interface. For example, in order to depressurize various hydraulic circuits for lifting, floating or tilting the header 12, an operator of the vehicle 10 may utilize a touch-screen interface of the display device 18 (see FIG. 1) in order to provide an appropriate input. This input may be received 202 then various operations executed in order to open 204 a lifting circuit control valve, open 206 a float circuit control valve, or open 208 a tilt circuit control valve. The various valves may be opened 204, 206, 208 simultaneously, or in various orders. Once opened, the valves may then be held open 210 in order to ensure that the relevant hydraulic systems are fully depressurized. For example, the method 200 may include holding the various control valves open 210 for as long as the vehicle is in an energized operating state 228 (e.g., so long as a key is not turned to "off").

In certain implementations, the PC method 200 may be implemented even if an engine of the relevant vehicle is not running. As noted above, for example, the PC a method 200 may be implemented to hold open 210 various control valves for as long as a key is not turned to "off." In certain implementations, the valves may be held open 210 with the engine operating (e.g., with the key turned to a "run" position). This may be useful, for example, if an operator wishes to place the various hydraulic circuits in an energy free state without shutting off the engine. In certain implementations, however, the valves may be held open 210 with the engine not running. For example, the valves may be held open 210 with the key turned to an "on" position, but not to the "run" position, or may be held open 210 after an engine stoppage, but before the key has been turned to "off." This may be useful, for example, in order to ensure that pressure from the various hydraulic circuits is appropriately released before maintenance or header transport, even if the engine is not operating (e.g., in the event of engine failure).

In certain implementations, a user interface may be utilized to direct 220 an operator to sequentially (or otherwise) provide inputs for de-pressurization of the relevant hydraulic circuits. This may be useful, for example, to preserve some degree of operator control when placing hydraulic systems for the header 12 in an energy free state, while also ensuring that various operations are executed in an appropriate order. For example, a user interface may be configured to automatically direct 220 an operator to provide a first input 222. The lifting circuit control valve may then be opened 204 based upon the first input 222. Once the operator has been directed 220 to provide the first input 222 (or once the first input 222 has been received 202), the operator may then be directed 220 to provide a second input 224. In certain implementations, the operator may then be further directed 220 to provide a third input 226. In the embodiment depicted, the lifting circuit control valve may be opened 204 based upon the first input 222, the float circuit control valve may be opened 206 based upon the second input 224, and the tilt circuit control valve may be opened 208 based upon the third input 226. It will be understood, however, that other sequences of inputs may be directed 220 or received 202, and that the first, second, and third inputs 222, 224 and 226 may alternatively result in the opening of various other control valves.

It will be understood that other implementations are also possible. For example, the float, lifting, and tilt circuits (as relevant) may be opened in various different orders or simultaneously or may be depressurized using different (or differently configured) control valves than those depicted in the various figures. Similarly, an operators may be directed 220 to provide sequential inputs with sequential instructions, or with a set of simultaneously-provided instructions. For example, an operator may be directed 220 to provide an input 224 to open 206 the float circuit control valve only after the lifting circuit control valve has been opened, or may be directed 220 in a single (or otherwise simultaneous) instruction to first provide an input 222 to open 204 the lifting circuit control valve and then provide an input 224 to open 206 the float circuit control valve.

In various embodiments, earlier-opened control valves (e.g., one or more lifting circuit control valves) may be held open at least until later-opened control valves (e.g., one or more float circuit control valves) have also been opened. This may help to ensure that the release of pressure from the later-opened circuit does not result in trapped energy in the earlier-opened circuit. For example, where the valves 92 and 94 are opened first, in order to depressurize the lifting cylinder 96, holding the valves 92 and 94 open while later opening the valves 102 and 112 may ensure that the releasing the header 12 from the upward force of the float cylinders 106 and 116 does not result in trapped pressure within the lifting circuit.

Figures 6A, 6B:
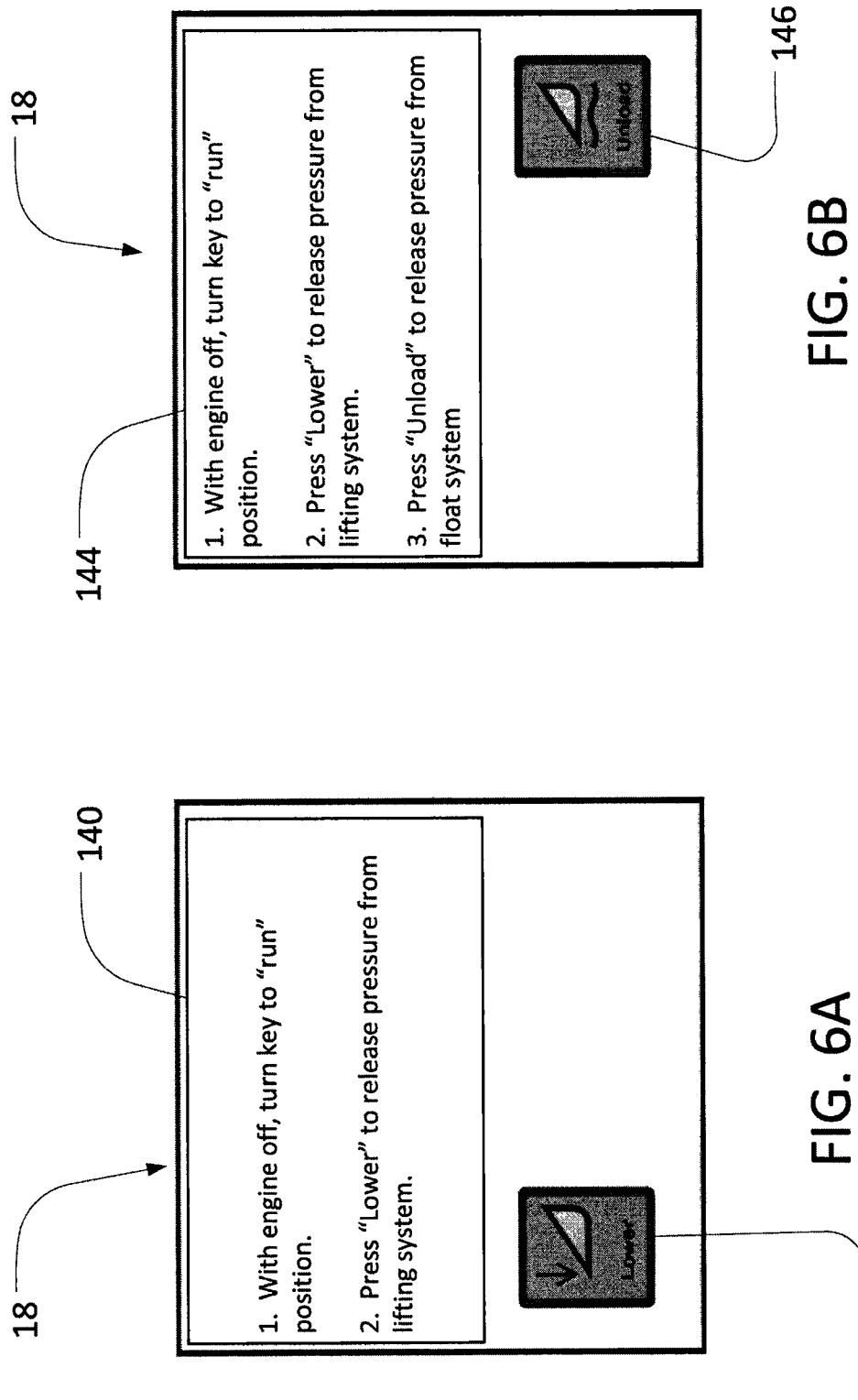
FIGS. 6A and 6B are schematic views of an example graphical user interface for the pressure control method of FIG. 5.

Referring also to FIGS. 6A and 6B, an operator may utilize the display device 18 to initiate the PC method 200. For example, the operator may activate an icon (not shown) on the display device 18 to start a de-pressurization sequence for the hydraulic circuit 14c (see FIG. 4). In response, the display device 18 may be configured to display a set of instructions 140, which may, for example, direct 220 the operator to first provide an input to drain the hydraulic lifting circuit. An icon 142 may be provided, for example, which the operator may select in order to open one or both of the valves 92 and 94 and thereby depressurize the lifting cylinder 96.

Once the lifting cylinder 96 (and the hydraulic lifting circuit) has been placed in an energy free state, the display device 18 may then display additional instructions 144, which may, for example, direct 220 the operator to next provide an input to drain the hydraulic float circuit. Another icon 146 may be provided, which the operator may select in order to open one or both of the valve 102 and 112 and thereby depressurize the hydraulic float circuit.

Other implementations may also be possible. In certain implementations, for example, once the float cylinders 106 and 116 and the hydraulic accumulators 104 and 114 have been placed in an energy free state (or once the lifting cylinder 96 has been placed in an energy free state) additional instructions (not shown) may be provided directing 220 the operator to next provide an input to drain the hydraulic tilt circuit. Again, another icon (not shown) may be provided, which the operator may select in order to drain the tilt circuit. As the tilt circuit is being depressurized, control valves for other circuits (e.g., the lifting and float circuits) may be held open, in order to ensure that no relevant systems remain pressurized.

As will be appreciated by one skilled in the art, certain aspects of the disclosed subject matter may be embodied as a method, system (e.g., a work vehicle control system included in the vehicle 10), or computer program product. Accordingly, certain embodiments may be implemented entirely as hardware, entirely as software (including firmware, resident software, micro-code, etc.) or as a combination of software and hardware (and other) aspects. Furthermore, certain embodiments may take the form of a computer program product on a computer-usable storage medium having computer-usable program code embodied in the medium.

Any suitable computer usable or computer readable medium may be utilized. The computer usable medium may be a computer readable signal medium or a computer readable storage medium. A computer-usable, or computer-readable, storage medium (including a storage device associated with a computing device or client electronic device) may be, for example, but is not limited to, an electronic, magnetic, optical, electromagnetic, infrared, or semiconductor system, apparatus, or device, or any suitable combination of the foregoing. More specific examples (a non-exhaustive list) of the computer-readable medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device. In the context of this document, a computer-usable, or computer-readable, storage medium may be any tangible medium that can contain, or store a program for use by or in connection with the instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electromagnetic, optical, or any suitable combination thereof. A computer readable signal medium may be non-transitory and may be any computer readable medium that is not a computer readable storage medium and that can communicate, propagate, or transport a program for use by or in connection with an instruction execution system, apparatus, or device.

Aspects of certain embodiments are described herein with reference to flowchart illustrations and/or block diagrams of methods, apparatus (systems) and computer program products according to embodiments of the invention. It will be understood that each block of any flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer-readable memory that can direct a computer or other programmable data processing apparatus to function in a particular manner, such that the instructions stored in the computer-readable memory produce an article of manufacture including instructions which implement the function/act specified in the flowchart and/or block diagram block or blocks.

The computer program instructions may also be loaded onto a computer or other programmable data processing apparatus to cause a series of operational steps to be performed on the computer or other programmable apparatus to produce a computer implemented process such that the instructions which execute on the computer or other programmable apparatus provide steps for implementing the functions/acts specified in the flowchart and/or block diagram block or blocks.

The flowchart and block diagrams in the figures illustrate the architecture, functionality, and operation of possible implementations of systems, methods and computer program products according to various embodiments of the present disclosure. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

The terminology used herein is for the purpose of describing particular embodiments only and is not intended to be limiting of the disclosure. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The description of the present disclosure has been presented for purposes of illustration and description, but is not intended to be exhaustive or limited to the disclosure in the form disclosed. Many modifications and variations will be apparent to those of ordinary skill in the art without departing from the scope and spirit of the disclosure. Explicitly referenced embodiments herein were chosen and described in order to best explain the principles of the disclosure and their practical application, and to enable others of ordinary skill in the art to understand the disclosure and recognize many alternatives, modifications, and variations on the described example(s). Accordingly, various embodiments

What is claimed is:

1. A pressure control system for an agricultural vehicle having a header, a hydraulic lifting circuit configured to raise and lower the header, a hydraulic float circuit configured to float the header with respect to ground, and at least one drain tank in hydraulic communication with the hydraulic lifting circuit and the hydraulic float circuit, the pressure control system comprising:
    a lifting circuit control valve configured to control drainage of hydraulic fluid from the hydraulic lifting circuit to the at least one drain tank;
    a float circuit control valve configured to control drainage of hydraulic fluid from the hydraulic float circuit to the at least one drain tank;
    a user interface; and
    a controller;
    wherein the user interface is configured to receive one or more inputs to control drainage of hydraulic fluid from one or more of the hydraulic lifting circuit and the hydraulic float circuit;
    wherein the controller is configured to open at least one of the lifting circuit control valve and the float circuit control valve, based upon the one or more inputs received at the user interface, in order to depressurize, respectively, at least one of the hydraulic lifting circuit and the float hydraulic float circuit; and
wherein the controller is configured to open the lifting circuit control valve and the float circuit control valve sequentially.

2. The pressure control system of claim 1, wherein the controller is configured to open the lifting circuit control valve before opening the float circuit control valve.

3. The pressure control system of claim 2, wherein the user interface is configured to direct an operator to provide a lifting circuit input to open the lifting circuit control valve before providing a float circuit input to open the float circuit control valve.

4. The pressure control system of claim 2, wherein the controller is configured to simultaneously hold open the lifting circuit control valve and the float circuit control valve.

5. The pressure control system of claim 1, wherein the controller is configured to hold open the at least one of the lifting circuit control valve and the float circuit control valve as long as the agricultural vehicle is in an energized operating state.

6. The pressure control system of claim 1, wherein the hydraulic float circuit includes a first hydraulic piston in communication with at least one hydraulic accumulator, the first hydraulic piston being configured to support the header when the hydraulic lifting circuit is pressurized and the float circuit control valve is closed; and
    wherein the hydraulic lifting circuit includes a second hydraulic piston configured to support the header when the hydraulic float circuit is pressurized and the lifting circuit control valve is closed.

7. The pressure control system of claim 1, further comprising:
    a hydraulic tilt circuit configured to tilt the header with respect to ground; and
    a tilt circuit control valve configured to control drainage of hydraulic fluid from the hydraulic tilt circuit to the at least one drain tank;
    wherein the user interface is further configured to receive an tilt circuit input to control drainage of hydraulic fluid from the hydraulic tilt circuit; and
    wherein the controller is further configured to open the tilt circuit control valve based upon the tilt circuit input received at the user interface, in order to depressurize the hydraulic tilt circuit.

8. A pressure control system for an agricultural vehicle having a header, a hydraulic lifting circuit configured to raise and lower the header, and at least one drain tank in hydraulic communication with the hydraulic lifting circuit, the pressure control system comprising:
    a lifting circuit control valve configured to control drainage of hydraulic fluid from the hydraulic lifting circuit to the at least one drain tank;
    a float circuit control valve configured to control drainage of hydraulic fluid from the hydraulic float circuit to the at least one drain tank;
    a user interface; and
    a controller;
    wherein the user interface is configured to receive one or more inputs to control drainage of hydraulic fluid from the hydraulic lifting circuit;
    wherein the controller is configured to open the lifting circuit control valve based upon one or more inputs received at the user interface, in order to depressurize the hydraulic lifting circuit;
    wherein the controller is further configured to open the float circuit control valve based upon the one or more inputs received at the user interface, in order to depressurize the hydraulic float circuit; and
    wherein the user interface is configured to direct an operator to open the lifting circuit control valve before opening the float circuit control valve.

9. The pressure control system of claim 8, wherein the controller receives a first input at the user interface directing the controller to open the lifting circuit control valve before the controller receives a second input at the user interface directing the controller to open the float circuit control valve.

10. The pressure control system of claim 8, wherein the controller is configured to open the lifting circuit control valve before opening the float circuit control valve.

11. The pressure control system of claim 8, wherein the controller is configured to hold open the lifting circuit control valve and the float circuit control valve as long as the agricultural vehicle is in an energized operating state.

12. The pressure control system of claim 8, wherein the hydraulic float circuit includes a first hydraulic piston in communication with at least one hydraulic accumulator, the first hydraulic piston being configured to support the header when the hydraulic lifting circuit is pressurized; and
    wherein the hydraulic lifting circuit includes a second hydraulic piston configured to support the header when the hydraulic float circuit is pressurized.

13. The pressure control system of claim 8, further comprising:
    a hydraulic tilt circuit configured to tilt the header with respect to ground; and
    a tilt circuit control valve configured to control drainage of hydraulic fluid from the hydraulic tilt circuit to the at least one drain tank;
    wherein the controller is further configured to open the tilt circuit control valve based upon the one or more inputs received at the user interface, in order to depressurize the hydraulic tilt circuit.

14. A pressure control method for an agricultural vehicle having a header, a hydraulic lifting circuit configured to raise and lower the header, a hydraulic float circuit configured to float the header with respect to ground, at least one drain tank in hydraulic communication with the hydraulic lifting circuit and the hydraulic float circuit, a lifting circuit control valve configured to control drainage of hydraulic fluid from the hydraulic lifting circuit to the at least one drain tank, a float circuit control valve configured to control drainage of hydraulic fluid from the hydraulic float circuit to the at least one drain tank, a user interface, and a controller in communication with the user interface, the hydraulic lifting circuit and the hydraulic float circuit, the pressure control method comprising:

receiving, at the user interface, at least one input;

opening the lifting circuit control valve, with the controller, based upon the at least one input provided to the controller, in order to depressurize the hydraulic lifting circuit;

opening the float circuit control valve, with the controller, based upon the at least one input provided to the controller, in order to depressurize the hydraulic float circuit; and holding open the lifting circuit control valve and the float circuit control valve as long as the agricultural vehicle is in an energized operating state.

15. The pressure control method of claim 14, further comprising:

directing an operator, via the user interface, to sequentially provide a first input and a second input as the at least one input;

wherein the lifting circuit control valve is opened based upon the first input; and wherein the float circuit control valve is opened based upon the second input, the float circuit control valve being opened after the lifting circuit control valve is opened.

16. The pressure control method of claim 14, wherein the vehicle further includes a hydraulic tilt circuit configured to tilt the header with respect to ground, and a tilt circuit control valve configured to control drainage of hydraulic fluid from the hydraulic tilt circuit to the at least one drain tank, the pressure control method further comprising:

opening the tilt circuit control valve, with the controller, based upon the at least one input received at the user interface, in order to depressurize the hydraulic tilt circuit.

\* \* \* \* \*